(12) United States Patent
Thatcher et al.

(10) Patent No.: US 6,954,860 B1
(45) Date of Patent: Oct. 11, 2005

(54) NETWORK COPY PROTECTION FOR DATABASE PROGRAMS

(75) Inventors: Jonathan Thatcher, Mountain View, CA (US); Clay Maeckel, San Jose, CA (US)

(73) Assignee: Apple Computer, Inc., Cupertino, CA (US)

( * ) Notice: Subject to any disclaimer, the term of this patent is extended or adjusted under 35 U.S.C. 154(b) by 926 days.

(21) Appl. No.: 09/847,123

(22) Filed: May 1, 2001

(51) Int. Cl.[7] .............................. H04L 9/00; H04L 9/32
(52) U.S. Cl. ...................... 713/201; 713/155; 713/193; 380/201; 709/227; 707/10; 705/51; 705/56; 705/57
(58) Field of Search .............................. 713/155, 193, 713/201; 380/201; 705/51, 56, 57; 707/10; 709/227

(56) References Cited

U.S. PATENT DOCUMENTS

| | | | | |
|---|---|---|---|---|
| 4,937,863 A | * | 6/1990 | Robert et al. ............... 710/200 |
| 5,235,642 A | * | 8/1993 | Wobber et al. ............. 713/156 |
| 5,390,297 A | * | 2/1995 | Barber et al. ............... 713/201 |
| 5,579,222 A | * | 11/1996 | Bains et al. ................ 717/167 |

* cited by examiner

*Primary Examiner*—Gilberto Barron
*Assistant Examiner*—Jung Kim
(74) *Attorney, Agent, or Firm*—Beyer Weaver & Thomas, LLP

(57) ABSTRACT

Improved techniques for implementing Network Copy Protection for database programs are disclosed. The techniques can provide Network Copy Protection across various platforms and/or connection protocols. Accordingly, the database programs can detect unlicensed use of the software even when different platforms and/or connection protocols are used by two instances (software copies) of the same database program. When unlicensed use of software is detected, access to data can be denied. As will be appreciated, in addition to supporting more conventional communication protocols, more prevalent connection protocols can be supported.

23 Claims, 6 Drawing Sheets

| Network Address (Identification) field | User Name field | Version Information field | Installation Code field |
|---|---|---|---|
| 502 | 504 | 506 | 508 |

Fig. 5

NETWORK COPY PROTECTION FOR DATABASE PROGRAMS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to databases and, more particularly, to Network Copy Protection (NCP) of database programs.

2. Description of the Related Art

Databases are used to store data in a manner that facilitates subsequent use of the data. A database includes one or more files, each of which contain one or more records. A record holds information about a subject or item in its various fields.

To allow a user to more easily access and manage data stored in databases, database programs have recently been developed. Database programs, among other things, often provide a user interface which allows the user to conveniently interact with the database program. By interacting with the user interface, the user of the database can perform various operations on the data stored in the database. The interface provided by the database program is typically a Graphical User Interface which allows the user to conveniently interact with the database program and, in turn, with the database. The user may interact with the graphical user interface to, for example, view the data in various ways. The visual representations provided to the user can include, for example, a browse mode. The browse mode allows records to be viewed, changed, sorted, deleted, or added.

FIG. 1 is a representative screen depiction from a conventional database program, namely, FileMaker Pro 4.0 by FileMaker Pro, Inc. of Santa Clara, Calif. The screen depiction pertains to an asset management database having three records. A browse mode for the first record of the ASSET MANAGEMENT database is depicted. The browse mode is suitable for on-line or screen viewing of the records of the asset management database and allows the records to be viewed or deleted. The data in the fields of the record can be changed, sorted, deleted or added in the browse mode.

Accordingly, the database program provides the user with the ability to conveniently access data which is stored locally in the database. It should be noted that the database program may also provide the capability to access data that is stored in a remote location. For example, the database program can be connected to another database program over a computer network. In this situation, one database program can act as a "guest" and establish a connection to the other database program ("host" database program). Via its connection to the host database program, the guest database program can, in turn, provide the user with access to data stored remotely.

One important goal is providing Network Copy Protection (NCP) for database programs. This means that only licensed copies of database programs should be allowed to operate (e.g., connect to another database program and access data remotely). In other words, if only one software license has been issued for a database program, two copies of the same data program should not be able to connect to another database program to access data.

Typically, a unique installation code is assigned to each licensed copy of database programs. The user is required to enter the installation code when the database program is installed. After the database program has been correctly installed with the installation code, every time the database program is started (or connects to the computer network) a check can be made to verify the installation code is not already in use. Conventionally, the database program does not make this verification itself. Rather, a naming (or name binding) protocol is utilized to make the verification depending on platform and/or connection protocol used by the database program. For example, the AppleTalk name binding protocol is used in Macintosh environments and the Network Basic Input Output System (NetBios) naming protocol is used in Windows environments. Thus, to implement Network Copy Protection for database programs, conventionally, a specific naming protocol is used depending on the particular platform and/or the connection protocol that is used.

One problem with using specific name binding protocols to handle Network Copy Protection is that this approach fails to detect copies of the same database when different platforms and/or different connection protocols are used. For example, if one copy of the database program is operating in the Windows environment and another copy of the same database program is operating in the Macintosh environment, the conventional approach fails to detect that two instances of the same database program are operating. Similarly, this failure can occur when two copies of the same database program are using different communication protocols.

Another problem is that the name binding protocols used by the conventional data programs are becoming obsolete, as more widely accepted connection protocols are becoming more prevalent. One prevalent protocol that has gained wide acceptance is Transmission Control Protocol (TCP). As such, both the Windows and the Macintosh environments support TCP. Unfortunately, however, TCP does not provide a suitable naming protocol that can readily be used to implement Network Copy Protection for database programs. Moreover, it is highly desirable to provide Network Copy Protection that can function across various platforms and connection protocols.

In view of the foregoing, there is a need for improved Network Copy Protection for database programs.

SUMMARY OF THE INVENTION

Broadly speaking, the invention relates to Network Copy Protection for database programs. In accordance with one embodiment of the invention, a database program capable of providing Network Copy Protection across various platforms and/or connection protocols is disclosed. Accordingly, the database program can detect unlicensed use of the software even when different platforms and/or connection protocols are used by two instances (software copies) of the same database program. When unlicensed use of software is detected, access to data will be denied by the database program. As will be appreciated, in addition to supporting more conventional communication protocols, the database program can support more prevalent connection protocols (e.g., TCP).

The invention can be implemented in numerous ways, including as a method, an apparatus, a computer readable medium, and a database system. Several embodiments of the invention are discussed below.

As a method for providing network copy protection for database programs operating in a computer network, one embodiment of the invention includes the acts of: sending a request for connection, said request being sent by a first database program to a second database program operating on the computer network; determining whether another copy of the first database program is connected to the second database program; and granting the request for connection to the first database program when it is determined that another copy of the guest database program is not connected to the database program.

As a database program operating on a computer network, one embodiment of the invention includes a first database program suitable for accessing data stored in a database. The first database program is capable of providing access to a second database program connected to the computer network. The access is provided to allow the second database program to access data stored in the database associated with the first database program. The first database program is capable of detecting whether the second database is a software copy of another database program, even if the second database program and its copy are operating in different platforms.

As another method for providing network copy protection for database programs operating in a computer network, another embodiment of the invention includes the acts of: sending an installation code identifier with session information to a host database program, the session information being sent by a guest database program to the host database program; determining whether the code identifier is in a list of connected guests, the list of connected guests including one or more installation code identifiers which are respectively associated with one or more guest database programs that are connected to the host database program; and establishing a connection between the guest and host database programs when it is determined that that the code identifier is not in a list of connected guests; and not establishing a connection between the guest and host database programs when it is determined that said code identifier is in a list of connected guests.

As a computer readable media including computer program code for providing network copy protection for database programs operating in a computer network, one embodiment of the invention includes: computer program code for sending a request for connection, the request being sent by a first database program to a second database program operating on the computer network; computer program code for determining whether another copy of the first database program is connected to the second database program; and computer program code for granting the request for connection to the first database program only when it is determined that another copy of the guest database program is not connected to the database program.

The advantages of the invention are numerous. Different embodiments or implementations may yield one or more of the following advantages. One advantage of the invention is that Network Copy Protection can be implemented for database programs operating on various software platforms. Another advantage of the invention is that that copy protection can be effectively provided even if different connection protocols are used by the database programs. Still another advantage is that the invention can be implemented to operate in an efficient manner and without significant change to the existing connection protocols and/or database programs. Yet another advantage of the invention is that Network Copy Protection can be implemented for more prevalent connection protocols.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 5 is a block diagram representation of session information transmitted in accordance with one embodiment of the invention.

DETAILED DESCRIPTION OF THE INVENTION

As noted in the background of the invention, there is a need for improved Network Copy Protection for database programs. More particularly, there is a need for database programs that, among other things, provide Network Copy Protection across various platforms and/or connection protocols.

Accordingly, the invention pertains to improved Network Copy Protection for database programs. In accordance with one embodiment of the invention, a database program capable of providing Network Copy Protection across various platforms and/or connection protocols is disclosed. Accordingly, the database program can detect unlicensed use of the software even when different platforms and/or connection protocols are used by two instances (software copies) of the same database program. When unlicensed use of software is detected, access to data will be denied by the database program. As will be appreciated, in addition to supporting more conventional communication protocols, the database program can support more prevalent connection protocols (e.g., TCP).

Embodiments of these aspects of the invention are discussed below with reference to FIGS. 2A–5. However, those skilled in the art will readily appreciate that the detailed description given herein with respect to these figures is for explanatory purposes as the invention extends beyond these limited embodiments.

Figure 1:
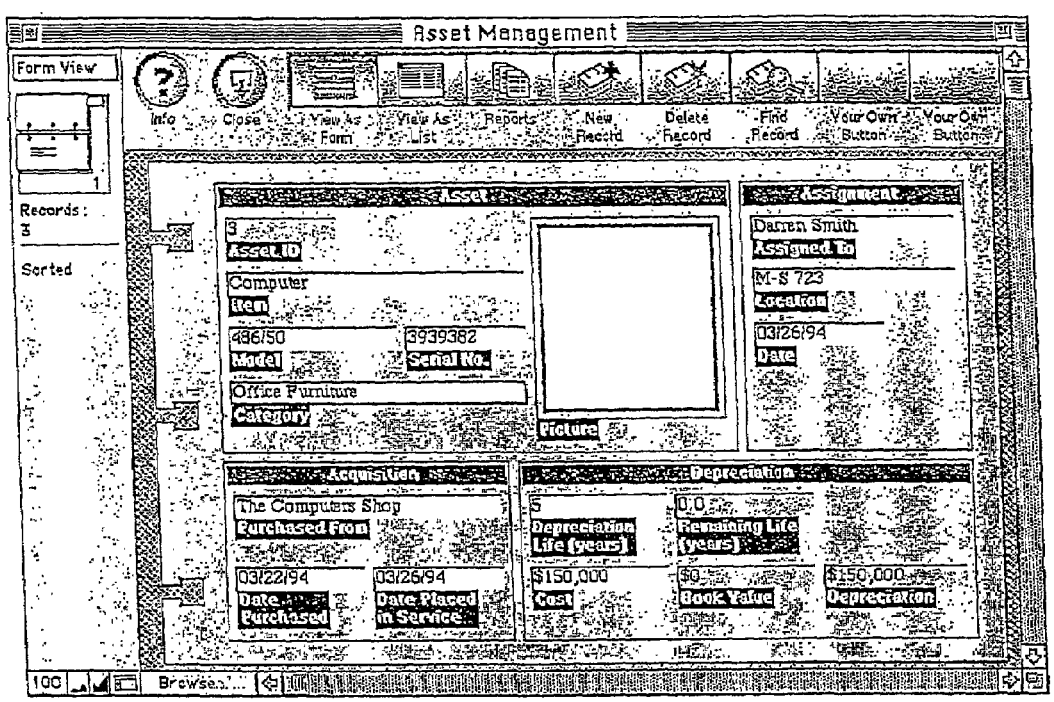
FIG. 1 is a representative screen depiction from a conventional database program.
Figure 2A:
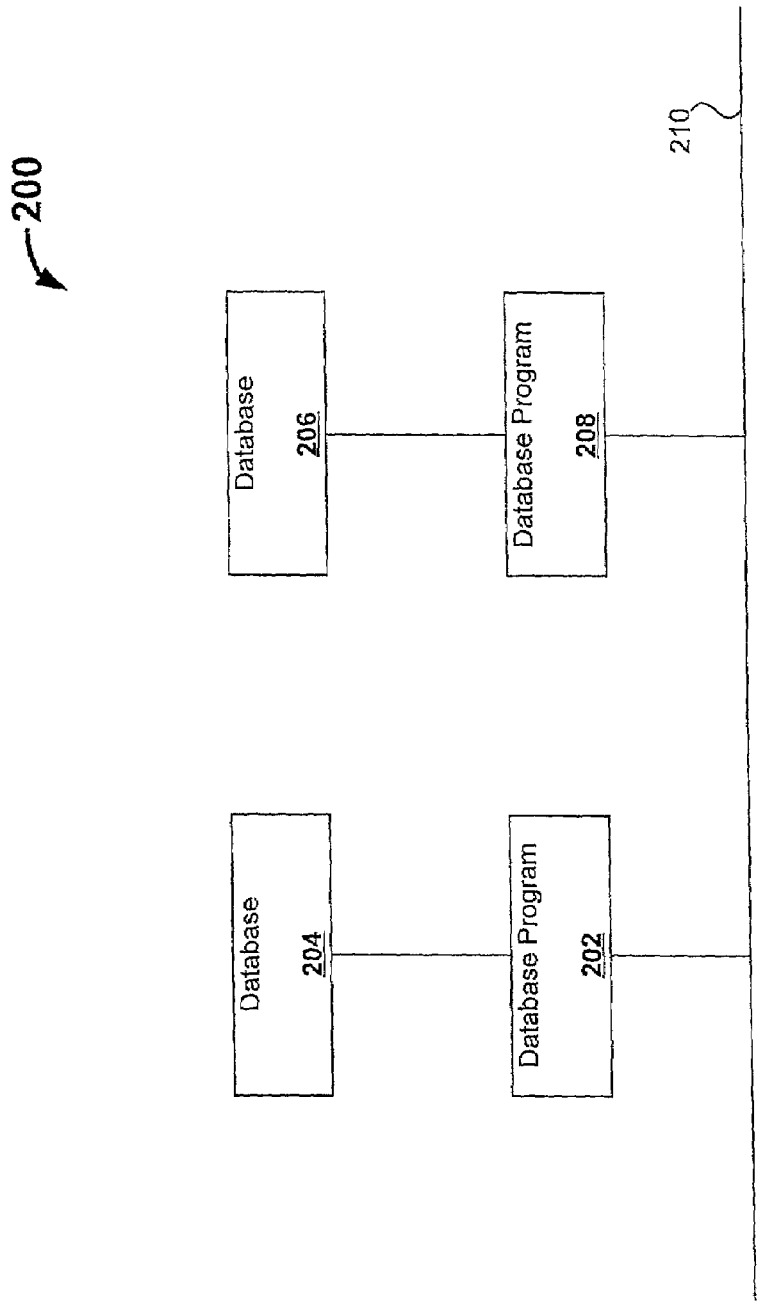
FIG. 2A illustrates a computer network in accordance with one embodiment of the invention.

FIG. 2A illustrates a computer network 200 in accordance with one embodiment of the invention. As shown in FIG. 2A, a database program 202 is connected to the computer network 200. The database program 202 can provide access to data stored on a database 204. The database 204 is typically stored at a site local to the database program 202. In addition to providing access to the database 204, the database program 202 may provide access to data stored in a database 206. It should be noted that the database 206 can be at a remote location with respect to the database 204 and database program 202. To access the remote database 206, the database program 202 establishes a connection to a database program 208. The database program 208 is also connected to the computer network 200. Accordingly, the database program 202 can establish a connection with the database 206 over the computer network 200 via a communication medium 210. When database program 202 is accessing the database 206 through the database program 208, the database program 202 can be referred to as the "guest" database program. In this situation, the database program 208 can be referred to as the "host" database program.

As will be appreciated, the database programs 202 and 208 can be in a "peer to peer" relationship with each other. In other words, both of the data base programs 202 and 208 can act as a guest or a host with respect to each other. This means that the database program 208 may also act as a "guest" and access the database 204 through the database program 202.

In any case, the guest database program typically sends a request for connection to the host database program over the computer network 200. The request sent by the guest database program includes software licensing information, for example, a licensing identification number (e.g., an assigned installation code). Before the host database program allows access to data stored in its local database, the host database program determines whether the request for connection has been made by a licensed copy of the guest database program. In other words, the host database program determines whether the request for connection comes from a database program that is using the same software licensing information as another database program.

In one embodiment, the host database program maintains a list of all the guest database programs connected to it. Each guest database program can be identified by its software licensing identifier. The software licensing identifier can be automatically sent, for example, by the guest database program when it wants to establish a connection to the host database program. As will be appreciated, the guest database program can send the software licensing identifier along with the session information which is typically sent by database programs over the computer network in order to establish a connection. This approach is more efficient since the session information needs to be sent to establish a connection (or session) between the two database programs over a computer network.

When the host database program receives the request for connection, it can extract the software licensing identifier. The software licensing identifier can be compared with the list of identifiers that the host program maintains. This ensures that the guest database program is not an unlicensed software copy. In this way, only one licensed copy of the database program can have access to other database programs over the computer network. Thus, Network Copy Protection can be provided for database programs.

Figure 2B:
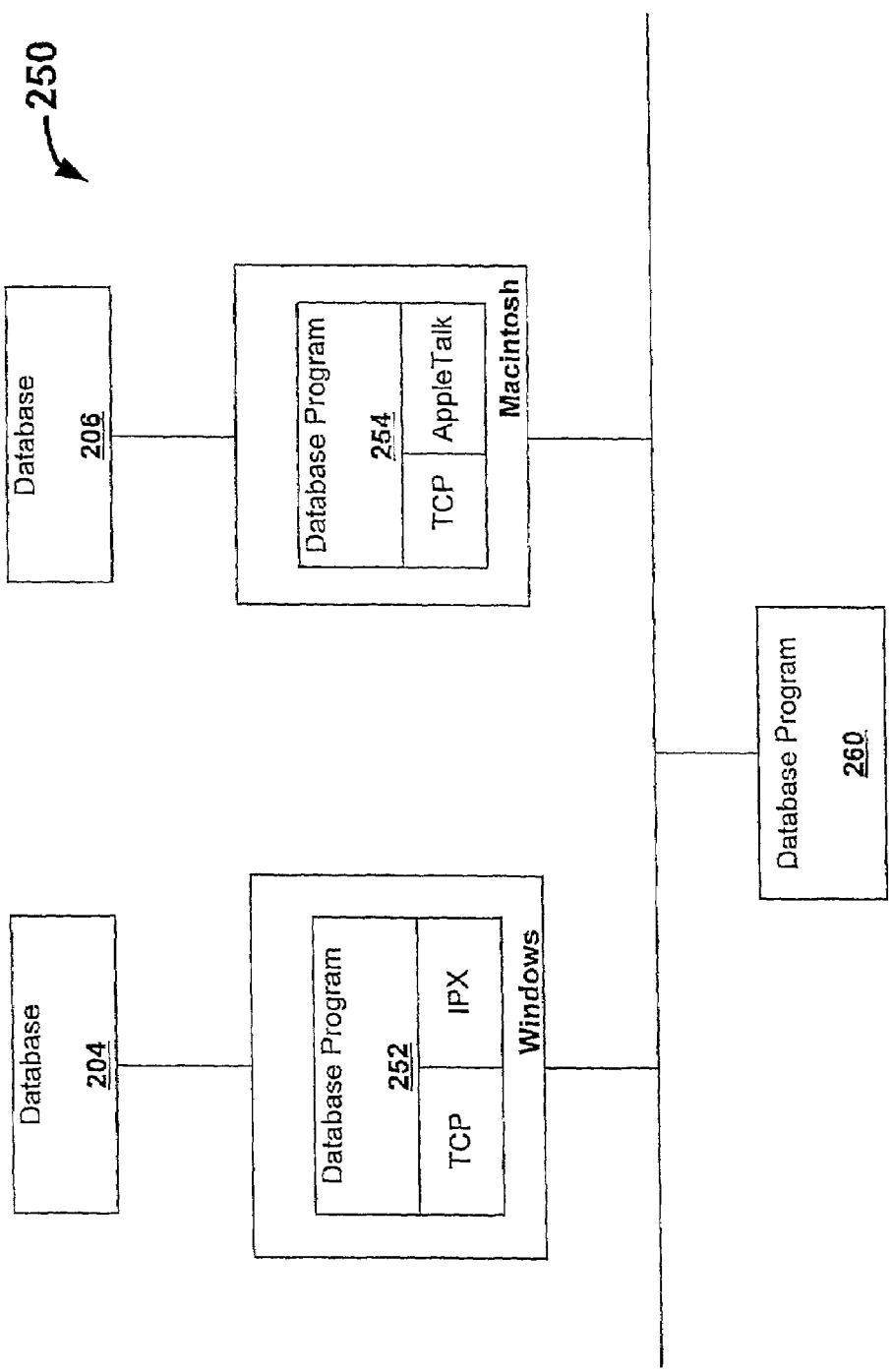
FIG. 2B depicts a computer network in accordance with another embodiment of the invention.

Moreover, in contrast to conventional techniques, Network Copy Protection can be provided across various platforms and/or connection protocols. This means that unlicensed use is detected, even if another software copy of the database 202 or database 208 is operating on a different platform or using a different connection protocol than the one used by the database 202 or database 208. To illustrate, FIG. 2B depicts a computer network 250 in accordance with another embodiment of the invention. The computer network 250 includes database programs 252 and 254. The database program 252 operates in the Windows environment and can provide access to data stored in the database 204. In addition, the database program 252 may use the connection protocol IPX or TCP to communicate over the computer network 250. On the other hand, the database program 254 is operating in the Macintosh environment and can use the AppleTalk connection protocol to communicate over the computer network 250, but similar to the database program 252, the database program 254 can also use the TCP connection protocol.

The database program 252 can provide access to the remote database 206 via a connection to the database program 254 over the computer network 250. Accordingly, the database program 252 has established a connection to the database program 254 to access the database. In this situation, the database program 252 is acting as the guest to the database program 254 which is acting as the host. As will be appreciated, while the guest database program 252 has established a connection to the host database program 254, another software copy of the database program 252 will not be granted a connection to the database program 254 and thereby access to the data stored in the database 206 will not be granted. By way of example, a database program 260, which is a software copy of the database program 252, will not be granted permission to establish a connection to the database 254 while the guest database program 252 is connected to the host database program 254.

Moreover, access will be denied by the database program 254 regardless of whether the database program 260 is operating in the Windows or Macintosh Environment. Furthermore, access will be denied regardless of whether the database program 260 uses IPX, AppleTalk, or TCP connection protocol to establish a connection to the host database program 254. Thus, Network Copy Protection can be provided for databases operating across various platforms and/or connection protocols.

Figure 3:
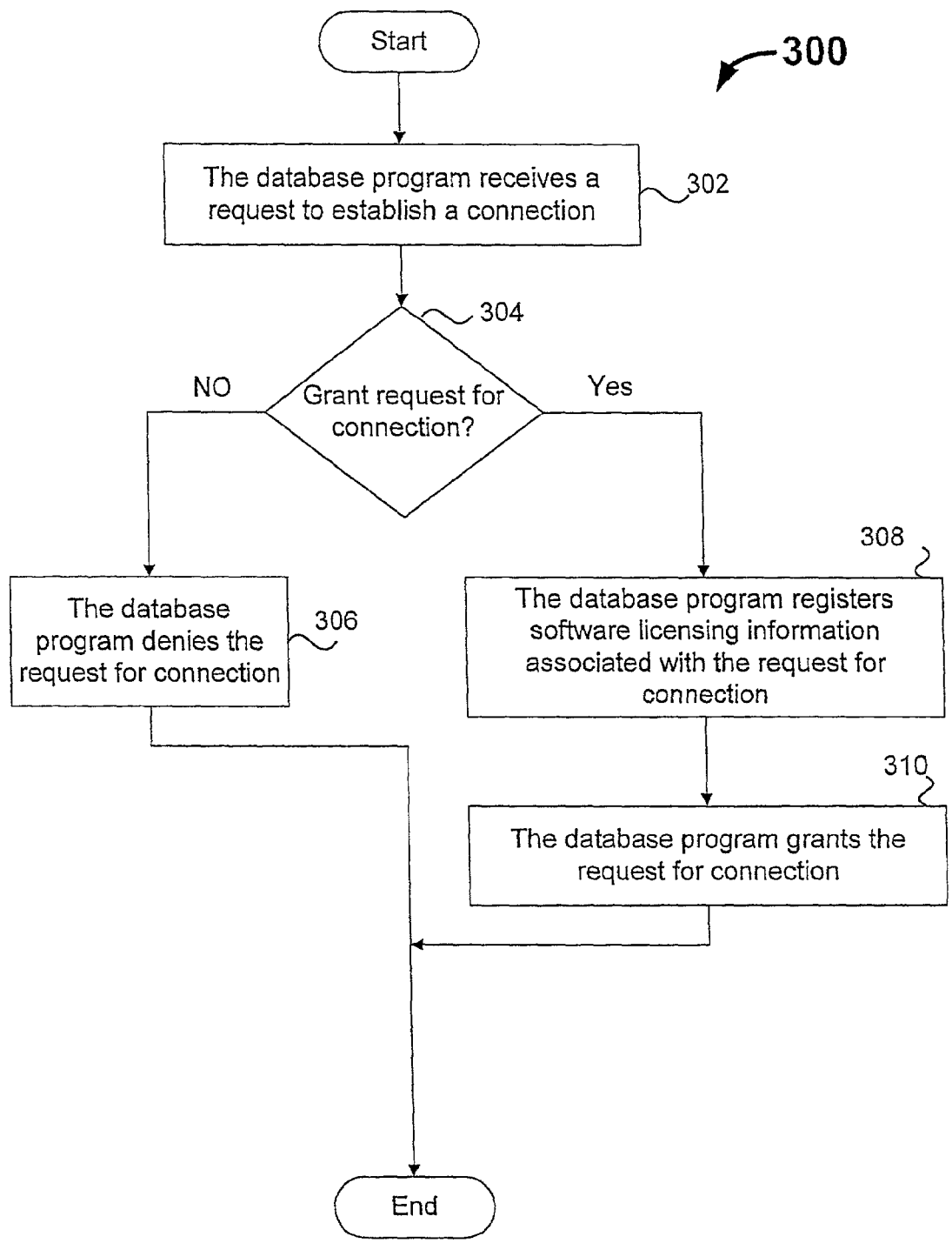
FIG. 3 illustrates a method for providing Network Copy Protection in accordance with one embodiment of the invention.

To further elaborate, FIG. 3 illustrates a method 300 for providing Network Copy Protection in accordance with one embodiment of the invention. The method 300 can be implemented, for example, by the database program 254 of FIG. 2B. Initially, at operation 302, a request for connection is received by the database program. This request is typically sent by another database program (i.e., a guest database program). Next, at operation 304, a determination is made as to whether the request for connection should be granted. If it is determined at operation 304 that the request for connection should not be granted, the method 300 proceeds to operation 306 where the database program denies the request to establish the connection. The method 300 ends following the operation 306.

On the other hand, if it is determined at operation 304 that the request for connection should be granted, the method 300 proceeds to operation 308 where the database program registers the software licensing information associated with the request for connection. Thereafter, at operation 310, the database program grants the request for connection. The method 300 ends following the operation 310.

Figure 4:
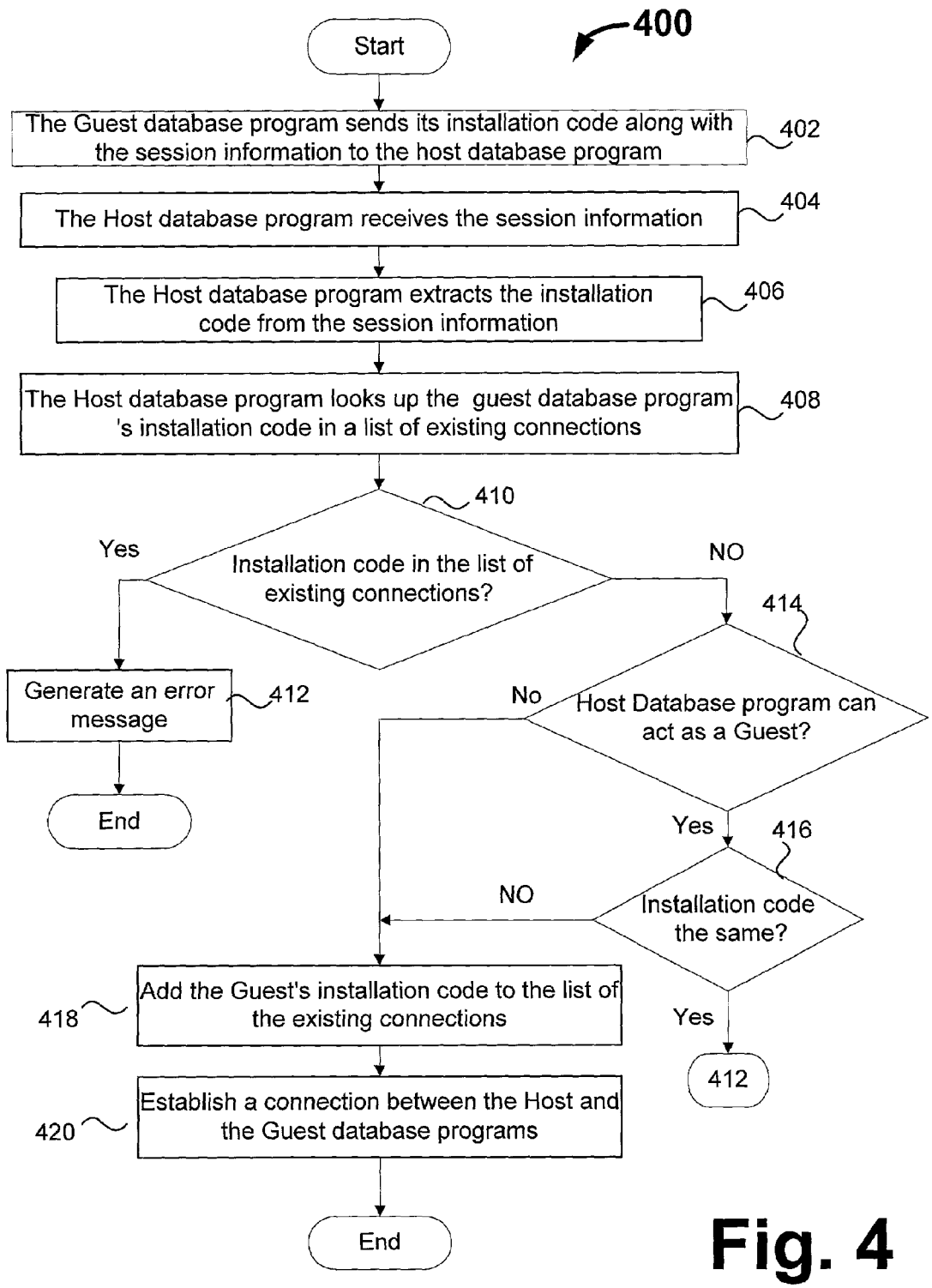
FIG. 4 illustrates in greater detail a method for providing Network Copy Protection in accordance with another embodiment of the invention.

FIG. 4 illustrates in greater detail a method 400 for providing Network Copy Protection in accordance with another embodiment of the invention. Initially, at operation 402, the guest database program sends its installation code along with session information to the host database. Next, at operation 404, the session information is received. At operation 406, the host database program extracts the guest database program's installation code from the session information. Thereafter, at operation 408, the guest database program looks up the guest database program's installation code in a list of existing connections. The list of existing connections includes the installation codes for the database programs that have established a connection to the host database program. Accordingly, at operation 410, a determination is made as to whether the guest database program's installation code has been found in the list of existing connections. If it is determined at operation 410 that the guest database program's installation code has been found in the list of existing connections, the method 400 proceeds to operation 412 where an error message is generated. This error message can, for example, be displayed by the guest database program to alert the user that, because of a licensing violation, the request for connection to the host database has been denied and access to data will not be allowed. The method 400 ends following the generation of the error message at operation 412.

On the other hand, if it is determined at operation 410 that the guest database program's installation code has not been found in the list of existing connections, the method 400 proceeds to operation 414 where a determination is made as to whether the host database program also has the capability to act as a guest database program. If it is determined at operation 414 that the host database program also has the capability to act as a guest database program, the method 400 proceeds to operation 416 where it is determined whether the guest database program's installation code is the same as the installation code assigned to the host database program. If it is determined at operation 416 that the guest database program's installation code is the same as the installation code assigned to the host database program, the method 400 proceeds to operation 412 where an error message can be generated. The method 400 ends following operation 412.

However, if it is determined at operation 416 that the guest database program's installation code is not the same as the installation code assigned to the host database program, the method 400 proceeds to operation 418. The method 400 also proceeds to operation 418 if it is determined at operation 414 that the host database program does not have the capability to act as a guest database program (e.g., the host database program is a server database program). In any case, at operation 418, the guest's installation code is added to the list of the existing connections. Thereafter, at operation 420 a connection between the host and guest database programs is established. The method 400 ends following operation 420.

As noted above, the guest database program can send its installation code along with session information to the host database program. FIG. 5 is a block diagram representation of a session information 500 in accordance with one embodiment of the invention. The session information 500 can automatically be sent by the guest database program to the host database program. Similar to conventional session information typically transmitted, the session information 500 includes a network address field 502, a user name field 504, and a version information field 506. However, in contrast to the session information conventionally transmitted, the session information 500 includes an installation code field 508 suitable for representing an installation code associated with a software license. The installation code can be represented in the installation code field 508, for example, as string using a predetermined amount of bytes (e.g., 32 bytes, 64 bytes, etc.).

As will be appreciated, the installation code field 508 can be provided as an attachment to the end of the conventional session information fields (e.g., fields 502, 504 and 506). This approach allows communication with conventional host database programs since the installation code field can effectively be ignored by the conventional database programs. Furthermore, sending the installation code along with the session information does not introduce much overhead since usually the session information needs to be sent to establish a connection. It should also be noted that this approach does not require establishment of a connection (or session) just so that software licensing information can be verified. Thus, including the installation code field as an attachment to the end of the session information conventionally sent by the guest database program is an efficient way of implementing Network Copy Protection for databases. In addition, this approach also provides backward compatibility with conventional database programs.

The invention can use a combination of hardware and software components. The software can be embodied as computer readable code on a computer readable medium. The computer readable medium can be any data storage device that can store data which can thereafter be read by a computer system. Examples of computer readable medium include read-only memory, random-access memory, CD-ROMs, magnetic tape, and optical data storage devices. The computer readable media can also be distributed over a network-coupled computer system so that the code is stored and executed in a distributed fashion.

The advantages of the invention are numerous. Different embodiments or implementations may yield one or more of the following advantages. One advantage of the invention is that Network Copy Protection can be implemented for database programs operating on various software platforms. Another advantage of the invention is that copy protection can be effectively provided even if different connection protocols are used by the database programs. Still another advantage is that the invention can be implemented to operate in an efficient manner and without significant change to the existing connection protocols and/or database programs. Yet another advantage of the invention is that Network Copy Protection can be implemented for more prevalent connection protocols.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of providing network copy protection for database programs operating in a computer network, said method comprising:

sending a request for connection, said request being sent by a first database program to a second database program operating on said computer network, wherein said first and second database programs can respectively access first and second databases which each store a plurality of tables therein, and wherein said first database program and said second database program respectively operate on different computing platforms;

determining, by said second database program, whether another copy of said first database program is connected to said second database program; and granting, by said second database program, said request for connection requested by said first database program when said determining determines that another copy of said first database program is not connected to said database program, thereby allowing network copy protection to be implemented for database programs operating in different computing environments.

2. A method as recited in claim 1, wherein said method further comprises;
registering said first database program with said second database program when said determining determines that another copy of the first database program is not connected to said database program.

3. A method as recited in claim 1, wherein said method further comprises:
denying said request for connection when said determining determines that another copy of the first database program is connected to said second database program.

4. A method as recited in claim 3, wherein said method further comprises:
generating an error message when said determining determines that another copy of the first database program is connected to said second database program.

5. A method as recited in claim 4, wherein said error message is displayed by said first database program.

6. A method as recited in claim 1,
wherein said request includes an identifier which identifies said first database program.

7. A method as recited in claim 6, wherein said determining of whether another copy of said first database program is connected to said second database program comprises:
looking up said identifier in a list of one or more identifiers which are respectively associated with one or more database programs that are connected to the second database program.

8. A method as recited in claim 7, wherein said method further comprises:
adding said identifier to said list of identifiers when said determining determines that another copy of said first database program is not connected to said second database program.

9. A method as recited in claim 1,
wherein said request is sent as session information; and
wherein said session information includes a licensing identifier associated with said first database program.

10. A method as recited in claim 1, wherein said first and second database programs respectively use different connection protocols to connect to said computer network.

11. In a computer network, a first database program suitable for accessing data stored in a database which stores a plurality of tables therein,
wherein said first database program is capable of, providing access to a second database program connected to said computer network, said access being provided to allow said second database program to access said data stored in a said database;
wherein said first database program is capable of, detecting whether said second database program is a software copy of another database program which has been granted access to said database by said first database program, and denying access to said second database program when said detecting detects that said second database program is a software copy of another database program which has been granted access to said database by said first database program; and
wherein said second database program and another database program are operating in different platforms.

12. A database program as recited in claim 11, wherein said second database program and said another database program use different connection protocols.

13. A database program as recited in claim 11, wherein said first database program can operate as a guest database program.

14. A method of providing network copy protection for database programs operating in a computer network, said method comprising:
sending an installation code identifier with session information to a host database program, said session information being sent by a guest database program to said host database program, wherein said host database program can provide said quest database program with access to a database which stores a plurality of tables therein, and wherein said host database program and said guest database program operate on different computing platforms;
determining, by said host database program, whether said code identifier is in a list of connected guests, said list of connected guests including one or more installation code identifiers which are respectively associated with one or more guest database programs that are connected to said host database program; and
establishing a connection between said guest and host database programs when said determining determines that said code identifier is not in a list of connected guests; and
not establishing a connection between said guest and host database programs when said determining determines that said code identifier is in a list of connected guests.

15. A method as recited in claim 14, wherein said method further comprises:
displaying an error message by the guest database program when said determining determines that said code identifier is in said list of connected guests.

16. A method as recited in claim 14, wherein said host database program can act as a host database program.

17. A method as recited in claim 14, wherein said guest and host database programs respectively operate on different platforms.

18. A method as recited in claim 14, wherein said guest and host database programs respectively use different connection protocols to connect to said computer network.

19. A computer readable media including computer program code for providing network copy protection for database programs operating in a computer network, said computer readable media comprising:
computer program code for sending a request for connection, said request being sent by a first database program to a second database program operating on said computer network, wherein said first and second database programs can respectively access first and second databases which each store a plurality of tables therein, and wherein said first database program and said second database program operate on different computing platforms;
computer program code for determining, by said second database program, whether another copy of said first database program is connected to said second database program; and
computer program code for granting said request for connection to said first database program only when said determining determines that another copy of the guest database program is not connected to said database program.

20. A computer readable media as recited in claim 19, wherein said computer program code for determining is performed by said second database program.

21. A computer readable media as recited in claim 19, wherein said computer readable media further comprises:
computer program code for registering said first database program with said second database program when said determining determines that another copy of the first database program is not connected to said database program.

22. A computer readable media as recited in claim 19, wherein said first database program and said second database program respectively operate on different platforms.

23. A computer readable media as recited in claim 19, wherein said first and second database programs respectively use different connection protocols to connect to said computer network.

* * * * *